Patented May 16, 1944

2,348,971

UNITED STATES PATENT OFFICE 2,348,971

PROCESS FOR THE SEPARATION OF THE CONSTITUENTS OF TALL OIL

Frederick H. Gayer and Charles E. Fawkes, Chicago, Ill., assignors to Continental Research Corporation, Chicago Heights, Ill., a corporation of Illinois No Drawing. Application April 7, 1942, Serial No. 438,006

15 Claims. (Cl. 260—97.5)

This invention relates to an improved process for the separation and recovery of the major constituents of organic mixtures or oils containing both resin acids and fatty acids, and particularly the clean, sharp and economic separation and recovery of the resin acids and the fatty acids from such mixtures or oils, and particularly from tall oil.

Tall oil is a by-product of sulphate or kraft paper manufacture, and is obtained by acidification of the black liquor soap, which is salted out and rises to the surface of the black liquor on standing. The main constituents of tall oil include fatty acids, resin acids, and unsaponifiable substances. While the bulk of the unsaponifiable matter consists of hydrocarbons, it also contains a considerable proportion of high-molecular weight cyclic alcohols belonging to the group of phytosterols.

Tall oil as such has found relatively little commercial use. It is not suited for soap making on account of its dark color, its odor and its high resin acid content, nor can it be used as a substitute for resin or other natural resins on account of its fatty acid content. On the other hand, the components of tall oil, especially the resin acids, fatty acids and phytosterol are of considerable commercial value. Therefore, a process for the sharp separation of the tall oil would be of great commercial value, especially in view of the vast potential supply of tall oil, resulting from the increasing importance of the sulphate process for paper making. Due to its low commercial value, tall oil is usually not even recovered in the present sulphate pulp establishments.

In the present application we propose a method for the separation of fatty and resin acids using only one solvent and conducting the extraction of the fatty acid esters under special conditions of resin acid concentration and with the addition of salt to the aqueous resin acid soap solution.

Briefly our process comprises esterifying the fatty acids and neutralizing the resin acids with aqueous alkali in such a way that the resulting resin acid soap solution contains a definite concentration of neutralized resin acids. We have found that if the concentration of the resin acids, as defined hereinafter, is less than approximately 30% we can effect a substantially complete separation of the mixture into fatty acid esters and resin acid soaps by extracting with a hydrocarbon solvent, provided there is present a certain and for each resin acid concentration definite amount of a neutral salt such as for example sodium chloride or sulphate. As the resin acid concentration is decreased below 30% progressively higher amounts of salt are required to effect a smooth and complete extraction until at approximately 5% resin acid concentration extraction is no longer possible.

We will now describe and illustrate by examples the individual steps in our process. Considering the variation in the composition of tall oils of different origin, it must be recognized that a certain latitude in procedure, in quantities, proportions, concentrations, temperatures, etc., is permissible within the limits outlined in this application.

Starting with a commercial grade of tall oil, we first esterify the fatty acids by reacting them with a low molecular weight, aliphatic, monohydric alcohol, as for example, methyl and ethyl alcohol, or the isomeric propyl, butyl or amyl alcohols. We effect the esterification at atmospheric pressure as for example by refluxing the tall oil with the alcohol in the presence of a catalyst. Or we may esterify at a superatmospheric pressure in the absence of a catalyst, as proposed in our co-pending application Serial No. 427,536, filed January 21, 1942. In either case, the esterification can be controlled in such a way as to include only the fatty acids, leaving the resin acids unreacted. Such esterifications are usually effected in the presence of an excess of the reacting alcohol which, after the esterification of the fatty acids is complete, is removed by distillation. The oily product is now composed of resin acids, fatty acid esters and unsaponifiable. The resin acid content of this mixture can be determined exactly by titration. Since esterification of the fatty acids involves a slight increase of the weight of the mixture, the resin acid content of the esterified mixture is, by necessity, slightly lower than that found by the usual analytical methods in the tall oil before esterification.

In the second stage of our process we neutralize the resin acids with an aqueous alkali such as, for example, sodium or potassium hydroxide or carbonate. Substantially complete neutralization of the resin acids is required, although slight deviations on either the acid or alkaline side are permissible and do not materially affect the results. For example, we might neutralize only 95% of the resin acids present, or we might add 5% of alkali in excess of that required for the neutralization of the resin acids without altering the nature of the subsequent separation. After neutralization, we have a mixture which consists essentially of the alkali soaps of the resin acids, fatty acid esters, unsaponifiable and water. Depending on the proportion of water present, the esters and unsaponifiable might form a transparent "solution" with the resin acid soap solution, or, as the proportion of water is increased, the mixture assumes the appearance of an ordinary, coarse emulsion in which at least a portion of the esters and unsaponifiable are dispersed in fine droplets. We found that the proportion of water to the resin acid soap dissolved in it is the critical factor which determines the colloid chemical behavior of the neutralized esterified mixture and makes a strictly quantitative expression of the elements entering into our process possible.

The quantitative relationship between water and resin acid soaps is expressed in a convenient form by the concentration of the resin acids present in water solution as soaps. This concept of resin acid concentration altogether disregards the presence of fatty acid esters and unsaponifiable. More specifically, this concentration is defined as the relationship of the weight of the resin acids before neutralization to the volume of the aqueous soap solution resulting after neutralization. The volume of the soap solution will be approximately equal to the volume of the resin acids and the volume of the alkali solution used plus any water added after neutralization. Assuming as a close approximation the specific gravity of the resin acids and that of the alkali solution as equal to one, the volume of the soap solution is easily obtained. The following example will show the simple calculation involved to obtain a desired resin acid concentration:

A tall oil in which the fatty acids were esterified showed an acid number of 76. On the basis of an equivalent weight of 302 for the resin acids, this acid number corresponds to a resin acid content of 41% by weight on the esterified mixture. One hundred grams of the esterified mixture contain 41 grams of resin acids, which require 136 cc. normal alkali for neutralization. On neutralizing the esterified mixture with normal alkali, the volume of the resulting soap solution will be 41+136=177 cc., and we consider the soap solution as containing $$\frac{41 \times 100}{177} = 23\% \text{ resin acids}$$

To obtain a resin acid concentration of, for example, 10% the 41 grams of resin acids would have to be contained in 410 cc. of soap solution and we would have to add to the above mixture 410−177=233 cc. more water. As a rule we use a stronger alkali than is required to obtain the exact resin acid concentration and then dilute the mixture with water until the desired resin acid concentration is reached. We are aware that in a strictly scientific sense the volume of the soap solution is not the exact sum of the volume of the resin acids and the alkali solution. However, we have found that for our purpose the approximation introduced is sufficiently precise and permits rapid calculation of the volume conditions involved. In the following specification and claims, the term "resin acid concentration" is always used in the sense as here defined, namely, to denote the concentration of the resin acids (present as soaps) in the aqueous soap solution, or the number of grams of resin acid contained in 100 cc. of soap solution.

It is known to those skilled in the art that extraction of soap solutions with hydrocarbon solvents is invariably effected in the presence of de-mulsifying agents, such as, for example, alcohols. In the laboratory determination of unsaponifiable matter the presence of alcohol in the soap solution is always required to avoid emulsification of the soap solution with the hydrocarbon solvent. We are also aware of United States Patent No. 1,736,802. The method disclosed in that patent consists of esterifying the fatty acids in tall oil using an excess of alcohol, neutralizing the mixture and treating the neutralized mixture with benzene to remove the fatty acid esters and unsaponifiable. At this point the alcohol originally used in excess over that necessary for the esterification of the fatty acids is still present in the mixture and according to the disclosure is recovered from the aqueous-alcoholic soap solution only after the extraction of the fatty acid esters. We consider the use of an alcohol as a de-mulsifying agent in the extraction of a neutralized esterified mixture of tall oil as far too expensive since it necessitates recovery and reconcentration of the alcohol so used. It is an essential feature of our process to remove the excess of alcohol used in the esterification immediately after esterification is completed and before the esterified mixture is neutralized. We have found in accordance with our co-pending application Serial No. 435,005, filed April 7, 1942, that if an esterified mixture so obtained is neutralized and extracted with a hydrocarbon solvent to remove the fatty acid esters, no troublesome emulsions are produced if the concentration of the resin acids is approximately 30% or higher. However, in accordance with the present invention we have further found that if the resin acid concentration is lower than approximately 30%, we can still obtain a smooth extraction if we add to the mixture a certain and definite amount of a neutral salt.

As is known to those skilled in the art, soap solutions, when extracted with a water immiscible solvent, invariably retain a quantity of that solvent which can be removed only by decomposing the soap with acid. On beginning the extraction solvent will be retained in the soap solution until the latter is saturated with the solvent and only then will efficient extraction begin. We have, therefore, found that the smoothness and the speed of the extraction are greatly increased, if, before starting the extraction, we dissolve in the soap solution a sufficient amount of the extracting solvent to saturate the soap solution. This is of a particular advantage if a continuous liquid-liquid extraction method is used where the quiescent extraction mixture is scrubbed by droplets of the extracting solvent.

Summarizing, our method of preparing an esterified mixture for extraction comprises neutralizing the esterified mixture with an aqueous alkali solution and adding water until the desired resin acid concentration below approximately 30% is obtained. We then mix it thoroughly with an amount of extracting solvent in excess of that ultimately required for saturating the soap solution. A stubborn emulsion of the solvent in the soap solution results and no separation of excess solvent occurs. Now we add small portions of a strong salt solution such as for example, sodium chloride, and after thorough mixing let stand for a few minutes. In adding the salt in small portions, we reach a point at which the excess solvent, together with a portion of the extractable matter, settles out as an upper layer. Both the upper and the lower layer are now clear and the interfare between them sharp. The mixture is now ready for extraction.

The salts we use are neutral, water soluble salts of the alkali metals. We have found that in replacing one salt with another one, equivalent portions are required to obtain the same effect. For this reason we find it convenient to express the salt concentration in terms of normality as related to the water present. For example, adding 0.45 gram sodium chloride to a neutralized esterified mixture containing 77 cc. water will result in a sodium chloride concentration of 0.1 normal. As salts we prefer to use sodium chloride or sodium sulphate. We may add the solid salt to the neutralized esterified mixture or we may, as we prefer, add it in the form of a rather concentrated solution. In the latter case, in order not to change the resin acid concentration, we make allowance for the water added with the salt solution by withholding the same amount of water in making up the neutralized esterified mixtures.

At the same resin acid concentration there is a lower limit of salt concentration which causes clear layer separation. This lower limit is also an optimum salt concentration since the quantity of solvent retained in the soap solution is small. An increase of the salt concentration beyond the lower limit up to approximately salting out concentration still gives a sharp and rapid layer separation, but the volume of the solvent retained in the soap solution and therefore the total volume of the layer to be extracted, increases with increasing salt concentration. For example, at a resin acid concentration of 29.4%, a sodium chloride concentration of 0.1 normal represents the lower limit of concentration which will effect layer separation. The volume of solvent retained in the soap solution is 72 cc. per 100 grams esterified mixture. At the same resin acid concentration we may add sufficient salt to obtain a salt concentration of 0.19 normal but the volume of the solvent retained in the soap solution is now 183 cc. per 100 grams esterified mixture. It is obvious that we will perform the extraction at a salt concentration of 0.1 normal.

Below a resin acid concentration of approximately 30% there is for each resin acid concentration a lower limit of salt concentration which causes separation of layers. This lower limit increases as the resin acid concentration decreases. At approximately 30% resin acid concentration the lower limit of salt concentration is of the order of 0.1 normal. At a resin acid concentration of approximately 5% the salt concentration has to be at least 0.35–0.4 normal to obtain layer separation. Resin acid concentrations between these two extremes will require salt concentrations between approximately 0.1 and 0.4 normal. Since the relationship between salt concentration and resin acid concentration cannot, as yet, be expressed in mathematical form, and since also there would exist deviations in this relationship when comparing esterified mixtures of different origin, we determine on a laboratory scale the salt concentration required for extracting an esterified mixture of a certain resin acid concentration and then apply the same proportions to plant scale runs. Once the lower limit of salt concentration is known, it is quite immaterial whether we add first the solvent to the neutralized esterified mixture and then the salt, or vice versa, we may also reverse the order of the three steps, namely neutralization, addition of solvent and addition of salt in any convenient way and obtain exactly the same result as in the procedure outlined heretofore.

The table illustrates the volume conditions found in the extraction of 100 grams esterified mixture with benzol. It also sets forth figures for salt concentrations required with various resin acid concentrations.

Table

| Resin acid concentration, per cent | Salt concentration, normal | Volume of mixture to be extracted, per 100 grams esterified mixture | Volume of solvent in mixture to be extracted, per 100 grams esterified mixture |
|---|---|---|---|
| | | Cc. | Cc. |
| 29.4 | 0.1 | 250 | 72 |
| 26.8 | 0.19 | 280 | 87 |
| 20.4 | 0.25 | 340 | 110 |
| 15.3 | 0.29 | 395 | 112 |
| 10.2 | 0.32 | 510 | 122 |
| 5.0 | 0.35 | 828 | 139 |

It is quite obvious from these figures that the resin acid concentration most favorable for extraction is slightly below 30%. At this concentration the volume of the layer to be extracted is at a minimum which coincides with a minimum for the solvent dissolved. At this concentration the volume capacity of the extraction equipment can be utilized more efficiently, the total quantity of solvent required is less than at any other concentration.

Our process is particularly useful where conditions at the outset require use of resin acid concentrations lower than 30%, as for example in the extraction of resin acid solutions containing a small portion of the original ester content, which are formed in the process of our copending application Serial No. 438,004, filed April 7, 1942. There the major portion of the esters are removed in the absence of a solvent at resin acid concentrations of from about 5 to about 30%. The residual portion of the esters and unsaponifiable matter can then be removed by the process of the present invention if we add the required quantity of salt, saturate the soap solution with the solvent and extract.

The last traces of esters and unsaponifiable are very tenaciously held by the soap solution and are extracted rather slowly. We have found that their extraction can be speeded up considerably by adding toward the end of the extraction, a small quantity of free resin acids to the mixture which is being extracted or to the solvent before it enters the extractor. For this purpose we can either use resin acids dissolved in the extracting solvent or we can use a small portion of fresh, not neutralized esterifield mixture. Most of the resin acids added in either form no doubt go over into the extract but their presence brings about a rapid and complete removal of the esters from the soap solution. The resin acids obtained from such a soap solution are of a high acid number, hard and of a high melting point, whereas even small traces of fatty acid esters in the resin acids cause a considerable depression of the melting point.

For extraction we prefer the continuous liquid-liquid extraction method using any suitable apparatus. This method requires a much smaller quantity of solvent than the batch method. While extraction at or somewhat below room temperature is possible, we prefer to keep the mixture to be extracted at approximately from 30 to 50° C.

As solvents for the extraction, we use petroleum solvents such as gasoline or naphtha fractions or aromatic hydrocarbons. Our preferred solvent is benzol.

The extract is a rather concentrated solution of the fatty acid esters and the major portion of the unsaponifiable in the extracting solvent. It also contains small quantities of free resin acids and resin acid soaps. After removing the solvent by distillation the free resin acid is neutralized and the resin acid soap either washed out with water or removed by separation according to the process of our aforesaid co-pending application Serial No. 438,004.

This latter separation process comprises the general steps of adjusting the resin acid concentration of the soap solution to from about 30 to about 5% and heating at a superatmospheric temperature to cause a formation of two layers, the soap solution comprising the lower layer. By this procedure we obtain soap-free and resin acid-free fatty acid esters which contain the major proportion of unsaponifiable matter originally present in the esterified mixture.

Acidification of the extracted soap solution sets free the resin acids and releases the solvent dissolved in the soap solution. The solvent is distilled and resin acids of a high acid number are recovered.

The starting material for our process may be either crude or refined tall oil. In using esterified mixtures made from crude tall oil, we obtain both the fatty and resin acid portion in a crude form, the fatty acid ester portion containing a major portion of the total unsaponifiable matter. The esters and unsaponifiable may then be subjected to a refining treatment with sulphuric acid in accordance with the process of our Patent No. 2,223,850 to obtain valuable phytosterol and refined esters containing only a fraction of the original unsaponifiable matter. We may also remove the phytosterol with a mild treatment with sulphuric acid and distill the esters to separate them from the major portion of the unsaponifiable. The crude resin acids also can be refined in accordance with the teachings of our aforesaid patent or any other known method for refining rosin.

If our starting material is refined tall oil, we obtain both the fatty acid and resin acid portions in a refined form. The fatty acid esters in this case will contain the major portion of the unsaponifiable matter. For this reason, it is desirable to start with a refined tall oil containing a low proportion of unsaponifiable.

The following examples are introduced to further illustrate our process, but are not to be construed as limiting the broad scope thereof.

*Example 1*

32.7 kilograms of a crude esterified mixture of an acid number of 65 and containing 35% resin acids were charged into an extractor and neutralized with 18.4 liters 2.06 normal sodium hydroxide. To the neutralized mixture 23.6 liters water and 3.8 liters of a 20% sodium chloride solution were added making a resin acid concentration of 20%. Now 90 liters benzol were stirred in, and after separating into two layers the mixture was extracted.

*Example 2*

6.6 kilograms of an esterified mixture made from refined tall oil were neutralized with 4 liters 2 normal sodium hydroxide. To the neutralized mixture 19 liters water and 1.84 liters of a 25% sodium chloride solution were added making a resin acid concentration of 8.6%. Sufficient benzol was now stirred in to cause a separation into two layers and the mixture extracted. There was obtained 4.3 kilograms esters and unsaponifiable extract which contained 2% free resin acids. These resin acids were removed by neutralization, adjusting the resin acid concentration to 10% heating the mixture to cause a formation of two layers and separating the upper layer of purified esters. We obtained 4.1 kilograms of light colored fatty acid esters containing 6% unsaponifiable.

*Example 3*

A mixture obtained after separating the major portion of the fatty acid esters and unsaponifiable from an esterified and neutralized tall oil according to our aforesaid co-pending application Serial No. 438,004 had a resin acid concentration of 7%. To 10 liters of the mixture 700 cc. of a 25% sodium chloride solution were added, the soap solution saturated with benzol and the mixture extracted. The extract consisted of 360 grams of esters and unsaponifiable. From this soap solution 675 grams of resin acids were recovered.

We claim as our invention:

1. A process for the separation and recovery of tall oil resin acids and fatty acids which comprises converting the fatty acids into their alkyl esters, removing excess alcohol remaining from said esterification, substantially completely neutralizing the resin acids with an aqueous alkali in dilution to provide a resin acid concentration of from about 30 to about 5 percent, adding thereto a neutral salt in an amount sufficient to provide a salt concentration of from about 0.1 to about 0.4 normal and to cause incipient layer separation on addition to and saturation of the soap solution with a solvent, and extracting the fatty acid esters from the resin acid soaps of the resulting mixture with a hydrocarbon solvent.

2. A process for the separation and recovery of tall oil resin acids and fatty acids which comprises converting the fatty acids into their alkyl esters, removing excess alcohol remaining from said esterification, substantially completely neutralizing the resin acids with an aqueous alkali in dilution to provide a resin acid concentration of from about 30 to about 5 percent, saturating the mixture with an excess of a hydrocarbon solvent, adding thereto a neutral water soluble salt in an amount sufficient to provide a salt concentration of from about 0.1 to about 0.4 normal and to cause layer separation, and extracting the fatty acid esters from the resin acid soaps of the resulting mixture with said hydrocarbon solvent.

3. A process for the separation and recovery of tall oil resin acids and fatty acids which comprises converting the fatty acids into their alkyl esters, removing excess alcohol remaining from said esterification, substantially completely neutralizing the resin acids with an aqueous alkali in dilution to provide a resin acid concentration of from about 30 to about 5 percent, adding thereto a neutral water soluble salt of an alkali metal in an amount sufficient to provide a salt concentration of from about 0.1 to 0.4 normal, and extracting the fatty acid esters from the resin acid soaps with a hydrocarbon solvent.

4. A process for the separation and recovery of tall oil resin acids and fatty acids which comprises converting the fatty acids into their alkyl esters, removing excess alcohol remaining from said esterification, substantially completely neutralizing the resin acids with an aqueous alkali in dilution to provide a resin acid concentration of from about 30 to about 5 percent, saturating the mixture with a hydrocarbon solvent, adding thereto a neutral water soluble salt of an alkali metal in an amount sufficient to provide a salt concentration of from about 0.1 to about 0.4 normal, and extracting the fatty acid esters from the resin acid soaps of the resulting mixture with a hydrocarbon solvent.

5. A process of separating fatty acids from resin acids contained in tall oil which comprises converting the fatty acids into their alkyl esters, removing excess alcohol remaining from said esterification, substantially completely neutralizing the resin acids with an aqueous alkali, adding thereto a neutral water soluble salt of an alkali metal, regulating the aqueous dilution of the mixture to provide a resin acid concentration of from about 30 to about 5% and a salt concentration of from about 0.1 to about 0.4 normal, saturating the mixture with a hydrocarbon solvent, and hydrocarbon solvent extracting the fatty acid esters from the resin acid soaps.

6. A process of separating fatty acids from resin acids contained in tall oil which comprises converting the fatty acids into their alkyl esters, removing excess alcohol remaining from said esterification, substantially completely neutralizing the resin acids with an aqueous alkali, adding thereto sodium chloride, regulating the aqueous dilution of the mixture to provide a resin acid concentration of from about 30 to about 5% and a salt concentration of from about 0.1 to about 0.4 normal, saturating the mixture with a hydrocarbon solvent, and hydrocarbon solvent extracting the fatty acid esters from the resin acid soaps.

7. A process of separating fatty acids from resin acids contained in tall oil which comprises converting the fatty acids into their alkyl esters, removing excess alcohol remaining from said esterification, substantially completely neutralizing the resin acids with an aqueous alkali, adding thereto sodium sulphate, regulating the aqueous dilution of the mixture to provide a resin acid concentration of from about 30 to about 5% and a salt concentration of from about 0.1 to about 0.4 normal, saturating the mixture with a hydrocarbon solvent, and hydrocarbon solvent extracting the fatty acid esters from the resin acid soaps.

8. A process of separating fatty acids from resin acids contained in tall oil which comprises, converting the fatty acids into their alkyl esters, removing excess alcohol used in the esterification reaction, substantially completely neutralizing the resin acids with an aqueous alkali and adjusting the aqueous content of the resulting soap solution to provide a resin acid concentration of from about 30 to about 5%, mixing therewith a hydrocarbon solvent in excess of the amount required to saturate the soap solution together with a neutral water soluble salt of an alkali metal in an amount sufficient to provide a salt concentration of from about 0.1 to about 0.4 normal and to cause a layer separation, extracting the fatty acid esters from the soap solution by continuous liquid-liquid hydrocarbon solvent extraction, and acidifying the extracted soap solution to set free the resin acids and to release dissolved solvent.

9. A process of separating fatty acids from resin acids contained in tall oil which comprises, converting the fatty acids into their alkyl esters, removing excess alcohol used in the esterification reaction, substantially completely neutralizing the resin acids with an aqueous alkali and adjusting the aqueous content of the resulting soap solution to provide a resin acid concentration of from about 30 to about 5%, saturating the soap solution with a hydrocarbon solvent and adding thereto a neutral water soluble salt of an alkali metal in an amount sufficient to provide a salt concentration of from about 0.1 to about 0.4 normal, subjecting the mixture to continuous liquid-liquid hydrocarbon solvent extraction to extract the fatty acid esters, and adding to the soap solution a relatively small amount of free resin acid near the end of the extraction period to facilitate rapid and complete removal of the esters from the soap solution.

10. A process of separating fatty acids from resin acids contained in tall oil which comprises, converting the fatty acids into their alkyl esters, removing excess alcohol used in the esterification reaction, substantially completely neutralizing the resin acids with an aqueous alkali and adjusting the aqueous content of the resulting soap solution to provide a resin acid concentration of from about 30 to about 5% and adding thereto a neutral water soluble salt of an alkali metal in an amount sufficient to provide a salt concentration of from about 0.1 to about 0.4 normal, saturating the soap solution with a hydrocarbon solvent, subjecting it to continuous liquid-liquid hydrocarbon solvent extraction to extract the fatty acid esters, adding to the soap solution a relatively small amount of free resin acid near the end of the extraction period to facilitate rapid and complete removal of the esters from the soap solution, freeing the fatty acid ester extract from entrained free resin acids and resin acid soaps, and acidifying the extracted soap solution to set free the resin acids and to release dissolved solvent.

11. The process of separating tall oil fatty acid esters from a solution thereof with tall oil resin acid soaps which comprises adding thereto a neutral water soluble salt of an alkali metal, adjusting the aqueous content to provide a resin acid concentration of from about 30 to about 5% and a salt concentration of from about 0.1 to about 0.4 normal, saturating the mixture with a hydrocarbon solvent, and hydrocarbon solvent extracting the fatty acid esters from the resin acid soaps.

12. The process of separating tall oil fatty acid esters and resin acid soaps which comprises adding thereto a neutral water soluble salt of an alkali metal, adjusting the aqueous content to provide a resin acid concentration of from about 30 to about 5% and a salt concentration of from about 0.1 to about 0.4 normal, saturating the mixture with a hydrocarbon solvent, and solvent extracting the fatty acid esters from the resin acid soaps.

13. The process of separating a tall oil fatty acid ester and resin acid soap mixture which comprises adjusting the aqueous content thereof to provide a resin acid concentration of from about 30 to about 5%, saturating the mixture with an excess of a hydrocarbon solvent, adding thereto a neutral water soluble salt of an alkali metal in an amount sufficient to provide a salt concentration of from about 0.1 to about 0.4 normal and to cause a layer separation, and solvent extracting the fatty acid esters from the resin acid soaps.

14. The process of separating a mixture of tall oil fatty acid esters and resin acid soaps having a resin acid concentration of from about 30 to about 5% which comprises adding thereto a neutral water soluble salt of an alkali metal in an amount sufficient to provide a salt concentration of from about 0.1 to about 0.4 normal, and solvent extracting the fatty acid esters from the resin acid soaps with a hydrocarbon solvent.

15. The process of separating fatty acids from resin acids contained in tall oil which comprises converting the fatty acids into their alkyl esters, substantially completely neutralizing the resin acids with an aqueous alkali in dilution to provide a resin acid concentration of from about 30 to about 5%, heating the mixture to cause a separation of two layers, recovering the upper layer composed of the major portion of the fatty acid esters and unsaponifiable matter, adding to said lower layer a neutral water soluble salt of an alkali metal in an amount sufficient to provide a salt concentration of from about 0.1 to about 0.4 normal, and extracting the remaining fatty acid esters from the resin acid soaps with a hydrocarbon solvent.

FREDERICK H. GAYER.
CHARLES E. FAWKES.